(12) United States Patent
Han

(10) Patent No.: US 9,043,143 B2
(45) Date of Patent: May 26, 2015

(54) METHOD FOR CAR NAVIGATING USING TRAFFIC SIGNAL DATA

(71) Applicant: Kyungpook National University Industry—Academic Cooperation Foundation, Daegu (KR)

(72) Inventor: Dong Seog Han, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 0 days.

(21) Appl. No.: 14/109,700

(22) Filed: Dec. 17, 2013

(65) Prior Publication Data

US 2015/0057923 A1 Feb. 26, 2015

(30) Foreign Application Priority Data

Aug. 21, 2013 (KR) .................. 10-2013-0099317

(51) Int. Cl.
*G08G 1/123* (2006.01)
*G08G 1/00* (2006.01)
*G01C 21/34* (2006.01)

(52) U.S. Cl.
CPC .................. *G01C 21/3492* (2013.01)

(58) Field of Classification Search
USPC ......... 701/117–119, 400, 410–412, 423, 428, 701/465; 340/988, 994, 995.1, 995.13
See application file for complete search history.

(56) References Cited

U.S. PATENT DOCUMENTS

| | | | | |
|---|---|---|---|---|
| 5,247,439 A * | 9/1993 | Gurmu et al. | ................... | 701/24 |
| 5,257,023 A * | 10/1993 | Furuya | ..................... | 340/995.13 |
| 5,257,194 A * | 10/1993 | Sakita | .......................... | 701/117 |
| 5,317,311 A * | 5/1994 | Martell et al. | ................ | 340/905 |
| 5,335,180 A * | 8/1994 | Takahashi et al. | ............ | 701/117 |
| 5,646,853 A * | 7/1997 | Takahashi et al. | ......... | 455/456.5 |
| 2011/0040621 A1* | 2/2011 | Ginsberg et al. | ........... | 705/14.49 |

FOREIGN PATENT DOCUMENTS

| | | |
|---|---|---|
| JP | 2008-096445 | 4/2008 |
| KR | 1020100040552 A | 4/2010 |
| KR | 1020110063728 A | 6/2011 |

* cited by examiner

*Primary Examiner* — Yonel Beaulieu
(74) *Attorney, Agent, or Firm* — Blakely Sokoloff Taylor & Zafman

(57) ABSTRACT

There is a provided a method for car navigating using traffic signal data. The method for car navigating is characterized of providing an optimized route for the earliest arrival to destinations by using signal system data of one or more traffic signals existing on a certain route.

4 Claims, 2 Drawing Sheets

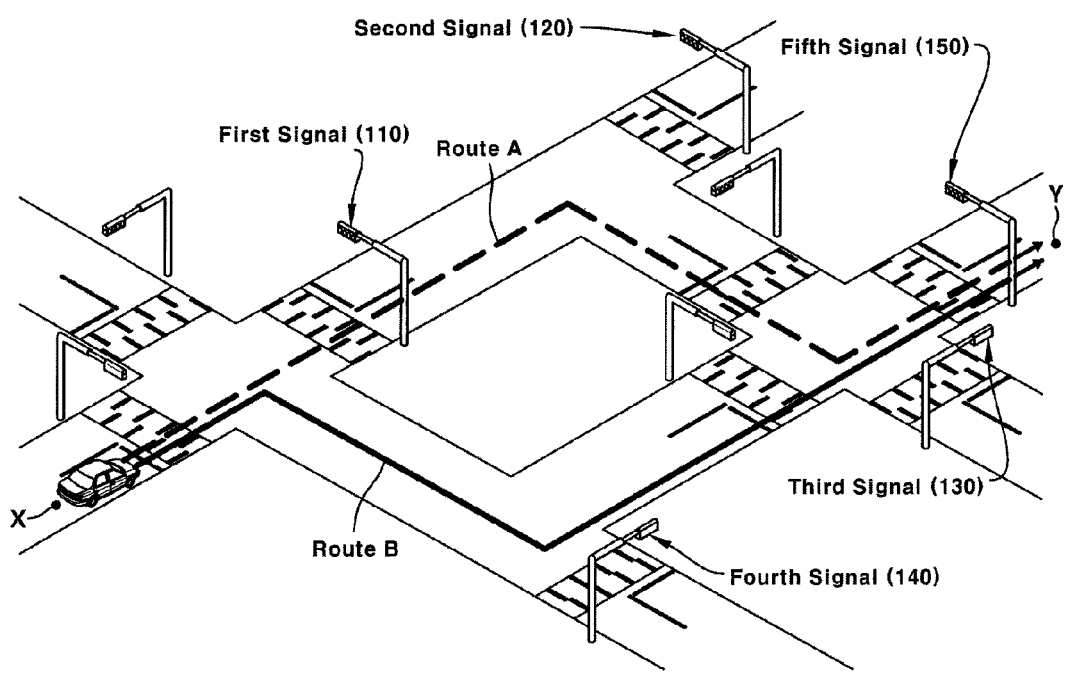

METHOD FOR CAR NAVIGATING USING TRAFFIC SIGNAL DATA

BACKGROUND

1. Field

The present disclosure relates to a method for car navigating using traffic signal data, and more specifically, relates to a method for car navigating configured to provide the shortest route to a destination by using signal system data of one or a plurality of traffic signals existing on a certain route.

2. Description of the Related Art

Generally, a Navigation system is configured to display current positions of vehicles, which are calculated by using received data from a Global Positioning System (hereinafter, "GPS") through a map installed on the screen.

Further, the Navigation system provides a driver with various navigation data necessary for driving, by displaying a progress direction of a vehicle, a distance to a destination, a current moving speed of a vehicle, a route set before driving, an optimized route to a destination, an expected time for arrival or a required time to the final destination.

Meanwhile, the recent Navigation system has been developed by providing data for driving on a route grounded on the map data stored on the storage media and reflecting real-time traffic data as well.

For example, the recent Navigation system is made to configure a driving route server and a traffic data server into a server system such as a data center; and to generate data for deriving a route to guide an optimized driving route by the server system; and to provide the generated data for deriving a route for members through a network.

The conventional Navigation system can judge which selection for a route is economic among a plurality of routes, from obtaining status data by separate routes (e.g., smoothness, delay, congestion) through services of Transport Protocol Experts Groups (TPEG); however, it cannot consider at all a time delayed by a stop signal of the traffic signal, during moving along the route. In this regard, even though a driver chooses a route optimized for a smooth pass from among a plurality of routes to the destination, there are possibilities to substantially be late for arrival in comparison with other routes since the wait time for signal on the route is longer than other's.

SUMMARY

The present disclosure is designed to solve the problems as described above, and it has an objective to provide a method for car navigating capable of providing a more economic route, by additionally using not only system data of the traffic signal on a certain route, but also status data by separate routes, which is obtainable through the TPEG.

The method for car navigating using traffic signal data according to an aspect of the present disclosure comprises the steps of:

(A) obtaining data of a current position;
(B) producing data of a plurality of routes to a destination with the current position as a standard;
(C) calculating an expected time for arrival to a destination by using signal system data of one or two more traffic signals positioned on the produced route; and
(D) displaying a route feasible to the fastest arrival from among calculated estimated times of arrival in regards to the plurality of routes.

The method for car navigating using traffic signal data may further comprise the steps of:

(E) reproducing data of the plurality of routes to the destination with the current position as a standard, if a time difference beyond a certain level generates between actual time data that shows an arrival at a randomly designated position and data that shows an expected time for arrival to the designated position, in driving on the routes;
(F) recalculating an expected time for arrival to the destination by using signal system data of one or two more traffic signals positioned on the route positioned at the route produced in the step (E); and
(G) selecting a route feasible to the fastest arrival by using data of the expected time for arrival produced in the step (F) and updating data of the displayed route to the data of the selected route.

The signal system data of traffic signal used in the step (C) may comprise any one or more selected from:

time data at which the traffic signal is changed to a certain signal;
time data for which the signal lasts; and
pattern data in which the signal is changed.

The expected time for arrival to the destination produced in the step (C) may be recalculated by using expected wait time data according to average moving speed data by separate routes produced from data of traffic volume by separate routes and the signal system data of one or two more traffic signals on the route.

The method may further comprise the step of:

(H) displaying time data for which a driver waits until the traffic signal is changed when a driver's vehicle is on waiting by a wait signal of a certain traffic signal.

The method for car navigating using traffic signal data according to the exemplary embodiments of the present disclosure may offer effects of providing a more economic route, by additionally using status data by separate routes which is obtainable through the TPEG and signal system data of the traffic signal on a certain route.

Moreover, a driver may be notified of a time at which the traffic signal is changed in advance, by using the signal system data of the traffic signal and thereby obtaining the time of the signal to be changed and data thereof beforehand. Thus, the driver may feel less boredom caused from waiting for the signal to be changed.

BRIEF DESCRIPTION OF THE DRAWINGS

FIG. 2 illustrates a view of an example of a method for car navigating of the present disclosure.

DESCRIPTION OF THE EXEMPLARY EMBODIMENTS

Figure 1:
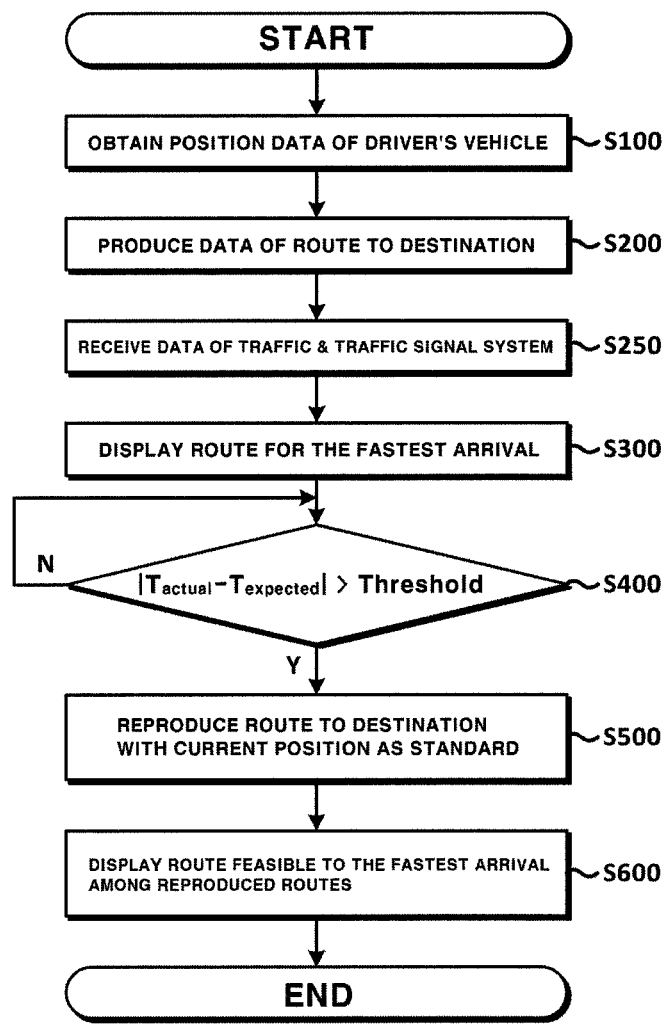
FIG. 1 illustrates a view of a method for car navigating according to an embodiment of the present disclosure.

The present disclosure may be embodied in many alternate forms, and various embodiments will now be described more fully with reference to the accompanying drawings in which specific embodiments are shown. However, it should be understood that there is no intent to limit the specific embodiments of the present disclosure, but the embodiments are to cover all modifications, equivalents and alternatives falling within the scope of the disclosure. In the description of the present disclosure, when it is determined that the detailed description of the known art related to the present disclosure would obscure the gist of the present disclosure, the description thereof will be omitted.

Further, it will be understood that although the terms "first", "second", etc. may be used herein to describe various elements, the elements should not be limited by these terms. These terms are only used to distinguish one element from another.

Furthermore, the terminologies used herein are for the purpose of describing particular embodiments only and are not intended to be limiting of the present disclosure. As used herein, the singular forms are intended to include the plural forms as well, unless the context clearly indicates otherwise. It is understood that the use of the term "comprises", "comprising", "include" or "including" in this specification is taken to specify the presence of stated features, integers, steps, operations, elements, components or combinations thereof, but does not preclude the inclusion of one or more additional features, integers, steps, operations, elements, components or combinations thereof.

Hereinafter, embodiments of the present disclosure will be described in detail with reference to the accompanying drawings.

FIG. 1 illustrates a method for car navigating according to an embodiment of the present disclosure.

As illustrated in FIG. 1, the method for car navigating according to an embodiment of the present disclosure comprises the steps of:
(A) obtaining data of a current position;
(B) producing data of a plurality of routes to a destination with the current position as a standard;
(C) calculating an expected time for arrival to a destination by using signal pattern data of one or two more traffic signals positioned on the produced route;
(D) displaying a route feasible to the fastest arrival from among calculated estimated times of arrival in the plurality of routes;
(E) reproducing data of the plurality of routes to the destination with the current position as a standard, if a time difference beyond a certain level generates between actual time data that shows an arrival at a randomly designated position and data that shows an expected time for arrival to the designated position in driving on the routes;
(F) recalculating an expected time for arrival to the destination by using the signal pattern data of one or two more traffic signals positioned on the route produced in the step (E); and
(G) selecting a route feasible to the fastest arrival by using data of the expected time for arrival produced in the step (F) and updating data of the displayed route to the data of the selected route.

At first, data of a current position of a driver's vehicle is obtained (S100). At the stage S100, the data of current position of driver's vehicle may be obtained through various methods.

For example, data of the current position of the driver's vehicle may be obtained by receiving signals for detecting a position such as latitude, longitude and altitude transmitted from a plurality of GPS satellites, through a GPS antenna and thereby using them.

Or, data of a current position of a driver's vehicle may be obtained from RoadSide Units (RSU) positioned around the vehicles, through a communication method of Wireless Access in Vehicular Environments (WAVE). For example, the position data of route installed with the RSU may be get through the WAVE communication method from the RSU positioned around a certain roadside.

Data of a plurality of routes to the destination is produced with the current position as a standard of the driver's vehicle which is obtained through the operation S100 above (S200). Hereat, the data of destination may be input from a driver through various methods. For example, the data of a destination would be input through an additional input device such as a keyboard, a mobile or a touch pad, and the data of the destination would be selected through methods of searching place name, or else.

Subsequently, traffic data of the plurality of routes produced in the operation above S200 and the signal system data of the traffic signal are received (S250). Hereat, the traffic data and the signal system data of the traffic signal may be delivered through a mobile communication network such as a TPEG, a WAVE, a 3G/4G and a Wi-Fi.

The said data may be transferred through a certain communication method simultaneously, or each data may be transferred respectively through a different communication method. As an example, traffic data by separate routes may be transferred through the TPEG method; signal system data of the traffic signal by the separate routes may be transferred through the WAVE method. A skilled person in the art would understand that the methods for receiving the data can be realized in many alternate forms within the scope of the gist of the present disclosure.

A route feasible to the fastest arrival is selected among the routes produced in the operation S200 and displayed by using the data received through the operation S250 (S300). To be specific, an expected time for arrival to the destination is calculated by using the route respective traffic data received in the operation S250 and signal system data of the traffic signal respectively, for each of the plurality of routes produced in the operation S200.

Hereinafter, a method of producing an expected time for arrival will be described in detail.

In order to calculate an expected time for arrival to the destination for the applicable embodiments of the present disclosure, an average speed of the vehicles by separate routes to the destination and the signal system data of the traffic signal by separate routes may be used. That is, the expected time for arrival to a certain traffic signal in the route may be calculated by using an average speed of the vehicles by separate routes; based on the calculation, it could be verified whether a driver can drive on a route to a destination, on arriving at the traffic signal, through the signal system data of traffic signal.

At first, as for an applicable embodiment of the present disclosure, the traffic data by separate routes received through the TPEG method may represent the status data for driving vehicles on a certain route, into status data of smoothness, delay, congestion. In this case, when driving on the route, an average speed by vehicles would be 60 km/h during smooth status, 20 km/h during delayed status, 5 km/h during congested status.

Or, if the average moving speed data of vehicles is included, in case of a certain route collected in the traffic data by separate routes which is received through the TPEG method; the data may be used intactly.

The signal system data of traffic signal may be transferred through a mobile communication network of a WAVE, a Wi-Fi, or a 3G/4G. For example, the data might be transferred through the TPEG method along with the traffic data by separate routes.

Hereat, in order to produce a route feasible to the fastest arrival to the destination, only the signal system data for the plurality of traffic signals that are positioned on the route to the destination is needed. Thus, an applicable embodiment to the present disclosure may only receive signal system data for one or two more traffic signals positioned on a certain route.

As for receiving the data, data regarding a certain route may be provided for a server which provides signal system data through a Navigation device or an additional input device.

Through the method as described above, the signal system data of a receivable traffic signal may be configured as a Table including signal data of each traffic signal that operates responsively to a certain time, and time data for which the signal is delayed. For example, a certain traffic signal displays a stop signal (red) from 10:00 to 10:03, and displays a proceed signal (green) from 10:03 to 10:04. Hereat, the signal system data for the traffic signal are configured as below Table 1.

TABLE 1

| Time that Signal is Changed | Signal Data | Duration Time |
|---|---|---|
| 10:00 | Stop Signal (Red) | 3 minutes |
| 10:03 | Proceed Signal (Green) | 1 minute |
| ... | ... | ... |

The constitutional modes for the signal system data are mere examples and the present disclosure is not limited thereto.

Through the methods described above, an expected cost time is made for each of the plurality of routes set from a starting spot to a destination. Then, the route feasible to the fastest arrival is selected and displayed.

Thereafter, among the routes to the destination, it may be judged whether a time difference beyond a certain level generates between time data at which a driver actually arrives at a randomly designated position and data of an expected time data of arrival to the set destination (S400). As an example, a value of three minutes is applied to the time difference. Hereat, regardless of an assumption that an expected time for arrival to the certain position is calculated as "X o'clock, Y minute(s)"; if a driver actually arrives at the certain position at "X o'clock, Y+5 minutes", it may be judged if time difference of 3 minutes or more had been generated between "$T_{actual} - T_{expected}$", through the operation S400.

If a time difference between an actual arrival time and an expected arrival time is judged as being more than a certain level, through the operation S400, data of a plurality of routes to the destination is reproduced on the basis of current position (S500). Hereat, the method of reproducing the data regarding routes to the destination was described through the operation S200 in detail, it will be omitted hereinafter.

The route feasible to the fastest arrival is displayed among the routes reproduced through the operation S500 (S600). Hereat, if route data to be displayed through the operation S600 is identical to route data already displayed through the operation S300, the route data would be displayed without any change. Contrariwise, if route data to be displayed through the operation S600 is different from the route data already displayed, the previous route data is displayed with updated into new route data produced through the operation S600.

Thereafter, the operations S400 to S600 may proceed repeatedly until arriving at the destination. Hereat, Threshold data applied to the operation S400 or period data applying the operations S400 to S600 may be set in advance by a driver or may be changed according to data to be input by a driver.

Hereinafter, a method for car navigating according to the present disclosure will be described in detail through an example illustrated in FIG. 2.

FIG. 2 illustrates a view of an example of a method for car navigating of the present disclosure.

As illustrated in FIG. 2, a vehicle is positioned at X. Hereat, a driver in the vehicle may input data regarding Y point (destination) through various methods. As an example, data regarding the Y point (destination) may be input through a touch panel installed in the Navigation.

Hereat, data of a plurality of routes is produced by using a position data of the vehicle (X) and data of the destination (Y). In the FIG. 2, routes A and B may be produced based on the route from X to Y.

Subsequently, traffic data by separate routes and signal system data of the traffic signal are received. As described earlier, the data may be received through various methods such as the mobile communication network of the TPEG, the WAVE, the 3G/4G and the Wi-Fi.

An expected time for arrival according to separate routes is calculated by using traffic data collected from each received route and using signal system data of the traffic signal on each route.

In the FIG. 2, the volume of traffic for each route is assumed to be identical. That is, it is assumed that a movement time cost by separate routes is identical.

Hereat, as to route A, a driver can arrive at the destination Y only if a first traffic signal 110, a second traffic signal 120 and a third traffic signal 130 are passed. To be specific, the driver may arrive at the destination Y, under the conditions of: receiving a straight signal at the first traffic signal 110; not necessarily receiving any signal at the second traffic signal 120; and again, receiving the left-turn signal at the third traffic signal 130. Hereat, it is assumed that three minutes cost until the signal of first traffic signal 110 is changed to the straight signal, and that approximately three minutes cost until the driver in vehicle gets the turn-left signal after arriving at the third traffic signal 130, moving along the route A.

On the other hand, as to route B, the driver may get to the destination Y only if the first traffic signal 110, the fourth traffic signal 140 and the fifth traffic signal 150 are passed. To be specific, the driver gets to the destination Y, under the conditions of: not receiving any signal at the first traffic signal 110; receiving the turn-left traffic signal at the fourth traffic signal 140; and receiving the straight signal at the fifth traffic signal 150. Hereat, it is assumed that approximately 2 minutes cost is expected until the driver in vehicle receives the turn-left signal after arriving at the fourth traffic signal 140 by moving along the route B and that approximately 2 minutes cost is expected until the driver in vehicle receives the straight signal after arriving at the fifth traffic signal 150.

In the case as described above, it may be determined that the route B is a route feasible to the fastest arrival to the destination Y, compared with the route A. That is, in the case of only using the traffic data by the separate routes provided in the conventional TPEG form, it could not distinguish which route is feasible to the fastest arrival among the routes A and B. However, in the method for car navigating using traffic signal data provided herein, a route for a faster arrival may be produced when additionally using signal system data of traffic signal by separate routes.

The route produced thereby may be provided for a driver through an additional display module. Like illustrated operations S400 to S600 in FIG. 1, if a time difference beyond a certain level generates between the actual arrival time data and the expected arrival time data, a route to the destination Y may be reproduced.

Also, as another example, if the vehicle is on waiting by a signal of waiting of a certain traffic signal, the driver may see the time data for which a driver waits until the traffic signal is changed. When moving along the route A in FIG. 2, if two minutes are left until the current signal (stop signal) of the first traffic signal 110 is changed to a signal configured to permit a pass, the expected wait time data for the signal to be changed may be displayed to the driver. The driver may easily check the remaining time for the signal to be changed through the data, and boredom caused by the waiting for the traffic signal may be reduced.

So far, the exemplary embodiments to the present disclosure were explored. A skilled person in the art may understand that the present disclosure would be realized in many alternate forms within the scope of the present disclosure. The foregoing exemplary embodiments and advantages are merely exemplary and are not to be construed as limiting the present disclosure. Also, the description of the exemplary embodiments of the present inventive concept is intended to be illustrative, and not to limit the scope of the claims. Further, it should be interpreted that all the differences in the range similar/equivalent to the present disclosure are included in the present disclosure.

What is claimed is:

1. A method for car navigating using traffic signal data through a vehicle navigation device, comprising:
   obtaining data of a current position (step A);
   producing data of a plurality of routes to a destination with the current position as a standard (step B);
   calculating an expected time for arrival to a destination by using signal system data of one or two more traffic signals positioned on the produced route and data of the traffic volume by separate routes (step C);
   displaying a route feasible to the fastest arrival from among calculated estimated times of arrival in the plurality of routes (step D);
   reproducing data of the plurality of routes to the destination with the current position as a standard, if a time difference beyond a certain level generates between actual time data that shows an arrival at a randomly designated position and data that shows an expected time for arrival to the designated position, in driving on the routes (step E);
   recalculating an expected time for arrival to the destination by using signal system data of one or two more traffic signals positioned on the route produced in the step E, and the average moving speed of vehicles on the routes based on data of traffic volume by separate routes received using the Transport Protocol Experts Group (TPEG) mobile communications network (step F); and
   selecting a route feasible to the fastest arrival by using data of the expected time for arrival produced in the step F and updating data of the displayed route to the data of the selected route (step G).

2. The method according to claim 1,
   wherein the signal system data of traffic signal used in the step C comprises any one or more selected from:
   time data at which the traffic signal is changed to a certain signal;
   time data for which the signal lasts; and
   pattern data in which the signal is changed.

3. The method according to claim 1,
   wherein the expected time for arrival to the destination in the step C is, calculated by using the average moving speed of vehicles on the routes based on data of the traffic volume by separate routes received using the Transport Protocol Experts Group (TPEG) mobile communications network, and expected wait time data according to the signal system data of one or two more traffic signals on the route.

4. The method according to claim 1, further comprising:
   displaying time data for which a driver waits until the traffic signal is changed when a driver's vehicle is on waiting by a wait signal of a certain traffic signal (step H).

* * * * *